US006724387B2

(12) United States Patent
Evankow, Jr. et al.

(10) Patent No.: US 6,724,387 B2
(45) Date of Patent: Apr. 20, 2004

(54) METHOD AND DEVICE TO CALCULATE AND DISPLAY THE PHASE TRANSFORMATION OF OPTICAL POLARIZATION

(75) Inventors: Joseph David Evankow, Jr., Colts Neck, NJ (US); Edward Collett, Lincroft, NJ (US)

(73) Assignee: FiberControl, Holmdel, NJ (US)

( * ) Notice: Subject to any disclaimer, the term of this patent is extended or adjusted under 35 U.S.C. 154(b) by 248 days.

(21) Appl. No.: 10/033,710

(22) Filed: Dec. 28, 2001

(65) Prior Publication Data

US 2002/0158871 A1 Oct. 31, 2002

Related U.S. Application Data

(60) Provisional application No. 60/258,846, filed on Dec. 28, 2000.

(51) Int. Cl.[7] ................................................ G06T 11/20

(52) U.S. Cl. ........................ 345/440; 345/441; 345/419; 345/426; 356/364

(58) Field of Search ................................ 345/440, 441, 345/419, 426; 356/364

(56) References Cited

U.S. PATENT DOCUMENTS

| | | | |
|---|---|---|---|
| 4,007,979 A | | 2/1977 | Coblitz |
| 4,451,874 A | | 5/1984 | Friedman |
| 5,227,623 A | | 7/1993 | Heffner |
| 5,657,552 A | | 8/1997 | Reineck et al. |
| 5,966,195 A | * | 10/1999 | Sato et al. ........... 349/187 |
| 6,233,371 B1 | | 5/2001 | Kim et al. |
| 6,300,954 B1 | | 10/2001 | Sato et al. |
| 6,373,614 B1 | * | 4/2002 | Miller .................. 359/237 |

OTHER PUBLICATIONS

A. Garcia Weidner, "The Poincaré Sphere: Isolated and Real Trajectories Describing the State of Polarization", Journal of Optics, vol. 23, No. 1, 1992, Paris, France, pp. 3–12.

Takanori Okoshi, "A Planar Chart Equivalent to Poincaré Sphere for Expressing State–of–Polarization of Light" Journal of Lightwave Technology, IEEE, vol. LT–4, No. 9, Sep. 1986, pp. 1367–1372.

Tedjojuwono et al, "Planar Poincare Chart: A Planar Graphic Representation of the State of Light Polarization", Applied Optics, vol. 28, No. 13, Jul. 1, 1989, pp. 2614–2622. With International Search Report.

M. Born et al, Principals of Optics, 7th ed., (© 1993 Cambridge University Press) pp. 30–32.

S. Huard, Polarization of Light, (© 1997 John wiley & Son) pp. 24–31.

(List continued on next page.)

*Primary Examiner*—Matthew C. Bella
*Assistant Examiner*—Po-Wei Chen
(74) *Attorney, Agent, or Firm*—Michaelson & Associates; Peter L. Michaelson

(57) ABSTRACT

Apparatus (1200, 1300) and accompanying methods to visualize and calculate, by direct visual measurement and interpolation, polarized light, in the form of sphere (observable polarization sphere—OPS) along with its associated spherical coordinate system consisting of latitudes and longitudes, which maps transformation of the state(s) of polarization (SOP) of an optical beam that propagates through either a single optical device (generally a "media") or a series of optical devices (mediums), e.g., phase shifters (waveplates, compensators), attenuators (polarizers), and field rotators. The OPS can be used to calculate and display phase shifting of the polarization state of an optical beam as it propagates through each such polarizing media. The OPS describes the behavior of a rotated ideal linear polarizer on a propagating polarized optical beam, as well as polarized light in many regions of the electro-magnetic spectrum.

1 Claim, 13 Drawing Sheets

OTHER PUBLICATIONS

E. Collett, Polarized Light: Fundamentals and Applications, (© 1992 Marcel Dekker) pp. 219–221.
F. Tosco, Fiber Optic Communications Handbook, (© 1990 TAB Books) pp. 257–272.
H.G. Jerrard, Modern Description of Polarized Light: Matrix Methods, (© 1982 Opt. Laser Tech.) pp. 309–319.
W.A. Shurcliff, Polarized Light, (© 1962 Harvard University Press) pp. 3, 71–77, and 144.

H.G. Jerrard, "Transmission of Light Through Birefringent & Optically Active Media: The Poincaré Sphere", J. Optical Soc. Amer., No. 8, 1954, pp. 543–549.

H. Poincaré, Théorie Mathematique de la Lumierè, Gauthiers–Villars, Paris, 1892, (© 1995 Editions Jaques Gabay) pp. 274–306.

* cited by examiner

Modeling SOP Phase Shift by an Angle $\phi$

Prior Art: Mueller/Stokes Calculus

Using OPS

Modeling Linear Horizontal Polarizer Rotated by Angle $\theta$

Prior Art: Mueller/Stokes Calculus

Using OPS

Modeling SOP Transformation Through N Devices

Prior Art: Mueller/Stokes Calculus

Using OPS

CONVERSION TO α, δ COORDINATES $$\alpha = \left(\frac{1}{2}\right)\cos^{-1}(S_1) \qquad 0 \leq \alpha \leq \pi$$

$$\delta = \tan^{-1}\left(\frac{S_3}{S_2}\right) \qquad 0 \leq \delta \leq 2\pi$$

CONVERSION TO STOKES PARAMETERS $$S_1 = \cos(2\alpha)$$

$$S_2 = \sin(2\alpha)\cos\delta \qquad -1 \leq S_i \leq 1; \quad i = 1, 2, 3$$

$$S_3 = \sin(2\alpha)\sin\delta$$

METHOD AND DEVICE TO CALCULATE AND DISPLAY THE PHASE TRANSFORMATION OF OPTICAL POLARIZATION

CLAIM TO PRIORITY

The applicants claim priority to co-pending United States provisional patent application entitled "A Method to Visualize the Polarization State of an Optical Beam Using a New Polarization Sphere", filed on Dec. 28, 2000 and assigned Serial No. 60/258,846, which is incorporated by reference herein.

BACKGROUND OF THE INVENTION

1. Field of the Invention

The invention relates to a method and apparatus for calculating and visually displaying polarization states of an optical beam as it propagates through polarizing elements (e.g., waveplates and polarizers).

2. Description of the Prior Art

Polarization is one of the fundamental properties of electromagnetic radiation. Numerous investigations over the past two hundred years have sought to understand and model the state of polarization (SOP) of optical beams. This has led to dozens of applications of polarized light such as the measurement of the refractive index of optical materials, saccharimetry, ellipsometry, fluorescence polarization, etc., to name only a few. In recent years, fiber optic communications have led to new problems involving polarized light. Bit rates at and above 10 Gb/s can manifest polarization-related signal degradation caused by the birefringence of the fiber optic transmission medium. To mitigate these effects, it is important to measure, model and display the SOP of the optical beam.

There are several standard methods for modeling the SOP of an optical beam. One of the most useful is a polarimetric method known as the Poincaré Sphere (PS) method. This method is particularly valuable because it provides a quantitative visualization of the behavior of polarized light propagating through an optical fiber or optical polarization devices.

The Poincaré Sphere was suggested by Henri Poincaré, a French mathematician, in the late 19th century. A goal of the Poincaré, Sphere was to serve both as a visualization (display) tool and a calculating tool to describe polarized light as a polarized beam propagated through polarizing elements. In large part, the Poincaré Sphere is based on an analogy with a terrestrial (or celestial) sphere. For example, one can readily determine a distance between two locations, e.g., London and New York, by using equations of spherical trigonometry or by directly measuring arc length along a great circle between the two locations using a terrestrial globe and a tape measure. Poincaré conceived that SOP transformations performed by optical devices could be similarly quantified in terms of distances on the Poincaré Sphere.

Poincaré was motivated by near-intractability of direct calculations of SOP transformations using mathematics of his day. Nevertheless, his hoped-for simplicity using the sphere did not occur. It was an excellent visualization tool but most practical calculations using the sphere were still extremely difficult to do. Poincaré does not appear to have taken into account that no single conventional spherical polar coordinate system could simplify all polarization calculations.

Computation problems for polarized light were first solved in the late 1940s with an introduction of algebraic methods of the Jones and Mueller/Stokes calculi. These parametric calculi, however, did not directly enable simple visualizations of polarized light interactions. Thus, they did not fulfill Poincaré's goal of a device that would allow both visualization and calculation to be made in the same space, and without resort to complex algebraic and trigonometric calculations. Modern digital computers have automated the Jones/Mueller/Stokes computations, but this still does not provide a simple geometric representation of how polarized light behaves as it propagates.

Remarkably, a consistent mathematical treatment of the Poincaré sphere did not appear until H. Jerrard's analysis in 1954, which provided some important clues about the problems with Poincaré's formulation. Jerrard wrote down the first formal algorithms for using the Poincaré sphere as a computing device and constructed a physical model to verify the usability of these algorithms. He found it necessary to mount a globe in a gimbal, with protractor markings, which could then be rotated with precision around both a north-south and an east-west axis. During computation, a reference point fixed in space above the surface of the sphere tracked the state of polarization, while the sphere was rotated underneath. The computational accuracy thus depended on mechanical stability, lack of eccentricity and manual dexterity.

To our knowledge, Jerrard's implementation never came into use as a computational aid, due to its difficulties in both manufacture and use. Our analysis of its mechanical and operational complexity led back to Poincaré's original polar coordinate system which is optimally oriented for carrying out calculations involving rotational elements (polarizing rotators such as quartz rotators) but is not oriented for modeling phase shifting elements (waveplates).

SUMMARY OF THE INVENTION

Because of this limitation in the art, we developed a new polarization sphere, which we call the Observable Polarization Sphere (OPS). Through using the OPS, the polarization state of any beam propagating through a polarizing media, e.g., waveplate and linear polarizer, can be readily calculated and displayed. Consequently, the OPS can be used to calculate and display polarization behavior of any polarized or partially polarized beam as it propagates through an optical polarization system consisting of a series of polarizing media, e.g., waveplates or rotated linear polarizers.

Specifically, the present invention provides a method to visualize and calculate through, e.g., visual interpolation, the polarization behavior of an optical beam as it propagates through an optical system (e.g., fiber, bulk, or integrated). Through the OPS, all polarization computations are reduced to sequences of simple angular displacements along latitude lines and a prime meridian in the OPS coordinate system. Advantageously, elaborate mechanical contrivances previously needed to calculate phase shifts using the Poincaré Sphere are eliminated. The OPS demands only ordinary map-reading skills from its users.

With regard to specific methods of the invention itself, calculating the behavior of an optical system begins with determining a location of an input SOP in the OPS coordinate system. The SOP transformations are modeled as sequences of phase shifting and linear polarization operations starting from the initial input SOP, according to the following rules: (a) phase shifts are calculated by measuring out angular displacements ($\phi$) along latitudinal circles (constant $\alpha$); and (b) attenuation by a rotated linear polarizer is represented by a discontinuous jump to the north pole of the OPS, which is then followed by an angular displacement (θ) along the prime meridian (δ=0, π).

By concatenating a sequence of such angular displacements, effects of any sequence of waveplates and polarizers upon a beam of polarized light may be calculated. Each angular displacement is indicated visually by an arc segment plotted on a visible rendering of the OPS. The point on the OPS, that results after all the displacements have been measured out, advantageously represents a final SOP for the beam emerging from the optical system.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
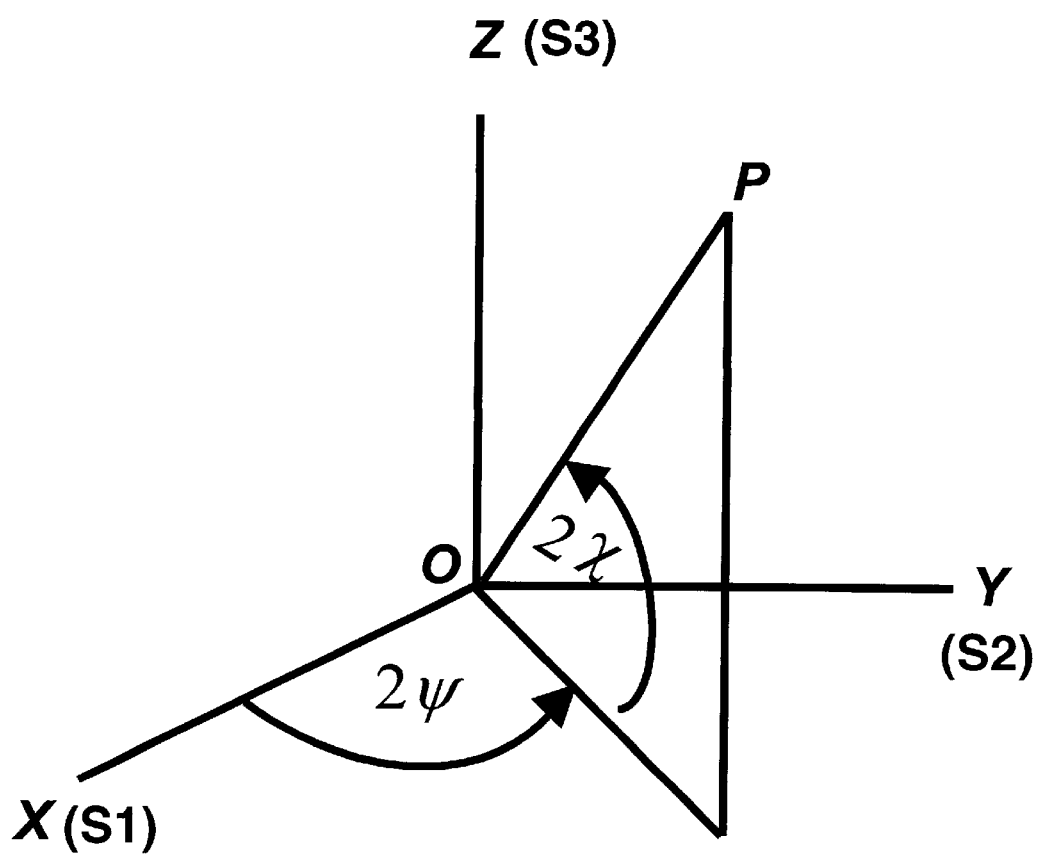
FIG. 1 depicts a spherical coordinates of the Poincaré Sphere.

Although the present invention is illustratively described in terms of light and optics, polarization is a basic property of all electromagnetic waves, regardless of wavelength. Consequently, the teachings of the present invention apply equally to all forms of electromagnetic radiation for which phase shifting and polarizing elements are available. Likewise, our inventive technique is equally applicable when using non-time-averaged electric field measurements, rather than the time-averaged values of Stokes parameters.

A. Mathematical Basis of the OPS

In order to understand the Observable Polarization Sphere (OPS) and its operation clearly, we will first present its mathematical formulation. We will do so by first describing the mathematics of the Poincaré Sphere, followed by the mathematics of the OPS. In both cases, Mueller matrices for field rotation, phase shifting and attenuation of a polarized beam are included. This is not to imply that use of the OPS requires manipulation of such matrices, but rather to provide confirmation to the reader that the OPS methods are sound, and agree with results of the Mueller/Stokes calculus.

1. General Background

Two formulations of polarized light exist. The first is in terms of amplitudes and absolute phases of the orthogonal components of an optical field. In the amplitude representation, orthogonal (polarization) components are given by the following equations:

$$E_x(z,t)=E_{0x}\cos(\omega t-kz+\delta_x) \quad (1a)$$

$$E_y(z,t)=E_{0y}\cos(\omega t-kz+\delta_y) \quad (1b)$$

Equations (1a) and (1b) describe two orthogonal waves propagating in the z-direction at a time t. In particular, in these equations, $E_{0x}$ and $E_{0y}$ are the peak amplitudes, $\omega t-kz$ is a propagator which describes propagation of the waves in time and space, and $\delta_x$ and $\delta_y$ are absolute phases of the wave components.

Equations (1a) and (1b) are instantaneous representations of the optical field. In general, these representations cannot be observed nor measured because of an extremely short time duration of a single oscillation, which is of the order of $10^{-15}$ seconds. However, if the propagator is eliminated between equations (1a) and (1b), then a representation of the optical field can be found that describes a locus of combined amplitudes $E_x(z,t)$ and $E_y(z,t)$. Upon doing this, the following equation results:

$$\frac{E_x(z,t)^2}{E_{0x}^2} + \frac{E_y(z,t)^2}{E_{0y}^2} - \frac{2E_x(z,t)E_y(z,t)}{E_{0x}E_{0y}}\cos\delta = \sin^2\delta \quad (2)$$

where $\delta=\delta_y-\delta_x$. Equation (2) describes an ellipse in its non-standard form and is known as the polarization ellipse. Thus, the locus of the polarized field describes an ellipse as the field components represented by equations (1a) and (1b) propagate. For special values of $E_{0x}$, $E_{0y}$, and $\delta$, equation (2) degenerates to equations for a straight line and circles; this behavior leads to the optical polarization terms "linearly polarized" light and "circularly polarized" light.

Equation (2), like equations (1a) and (1b), can neither be observed nor measured. However, an observed form of equation (2) can be found by taking a time average. When this is done, equation (2) is transformed to equation (3a) as follows:

$$S_0^2=S_1^2+S_2^2+S_3^2 \quad (3a)$$

where:

$$S_0=E_{0x}^2+E_{0y}^2 \quad (3b)$$

$$S_1=E_{0x}^2-E_{0y}^2 \quad (3c)$$

$$S_2=2E_{0x}E_{0y}\cos\delta \quad (3d)$$

$$S_3=2E_{0x}E_{0y}\sin\delta \quad (3e)$$

Equations (3b) through (3e) are known as "Stokes polarization parameters" which, because these represent intensities, are observable characteristics (measurables) of the polarization of the optical field. In order to determine the polarization of the optical field, all four Stokes polarization parameters must be measured. The first Stokes parameter $S_0$, is a total intensity of the optical beam. The remaining three parameters, $S_1$, $S_2$, and $S_3$ describe the (intensity) polarization state of the optical beam. Parameter $S_1$ describes a preponderance of linearly horizontal polarized light over linearly vertical polarized light. Parameter $S_2$ describes a preponderance of linearly +45° polarized light over linearly −45° polarized light. Finally, parameter $S_3$ describes a preponderance of right-circularly polarized light over left-circularly polarized light. The Stokes parameters, equation (3a), can be written as a column matrix known as the "Stokes vector" as indicated by equation (4):

$$S = \begin{pmatrix} S_0 \\ S_1 \\ S_2 \\ S_3 \end{pmatrix} = \begin{pmatrix} E_{0x}^2 + E_{0y}^2 \\ E_{0x}^2 - E_{0y}^2 \\ 2E_{0x}E_{0y}\cos\delta \\ 2E_{0x}E_{0y}\sin\delta \end{pmatrix} \quad (4)$$

Equation (4) describes elliptically polarized light. However, for special conditions on $E_{0x}$, $E_{0y}$, $\delta$, equation (4) reduces to important degenerate forms for: a) linearly horizontal (LHP) and linear vertical polarized (LVP) light, b) linear +45° (L+45 P) and linear −45° (L−45 P) polarized light, and c) right- (RCP) and left-circularly (LCP) polarized light. The Stokes vectors for these states in their normalized form ($S_0=1$) are given by equation (5) as follows:

$$S_{LHP} = \begin{pmatrix} 1 \\ 1 \\ 0 \\ 0 \end{pmatrix} S_{LVP} = \begin{pmatrix} 1 \\ -1 \\ 0 \\ 0 \end{pmatrix} S_{L+45P} = \begin{pmatrix} 1 \\ 0 \\ 1 \\ 0 \end{pmatrix} S_{L-45P} = \begin{pmatrix} 1 \\ 0 \\ -1 \\ 0 \end{pmatrix} S_{RCP} = \begin{pmatrix} 1 \\ 0 \\ 0 \\ 1 \end{pmatrix} S_{LCP} = \begin{pmatrix} 1 \\ 0 \\ 0 \\ -1 \end{pmatrix} \quad (5)$$

Finally, a polarized optical beam can be transformed to a new polarization state S' by using a waveplate, rotator and/or linear polarizer. This is described by a matrix equation of the form given by equation (6):

$$S' = M \cdot S \quad (6)$$

where: M is a 4×4 matrix known as the "Mueller" matrix.

The Mueller matrix for a waveplate with its fast axis along the horizontal x-axis and a phase shift of $\phi$ is given by equation (7):

$$M_{WP}(\phi) = \begin{pmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{pmatrix} \quad (7)$$

Similarly, the Mueller matrix for a rotator (rotated through a positive (counter-clockwise) angle through an angle $\theta$ from the horizontal x-axis) is given by equation (8):

$$M_{ROT}(\theta) = \begin{pmatrix} 1 & 0 & 0 & 0 \\ 0 & \cos2\theta & \sin2\theta & 0 \\ 0 & -\sin2\theta & \cos2\theta & 0 \\ 0 & 0 & 0 & 1 \end{pmatrix} \quad (8)$$

Finally, the Mueller matrix for an ideal linear polarizer with its transmission along the horizontal x-axis is given by equation (9):

$$M_{POL} = \frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix} \quad (9)$$

For rotation of a waveplate or polarizer through an angle, $\theta$, the Mueller matrix is found to transform according to equation (10) as follows:

$$M(\theta) = M_{ROT}(-\theta) \cdot \hat{M} \cdot M_{ROT}(\theta) \quad (10)$$

where $\hat{M}$ is either $M_{POL}$ for a polarizer or $M_{WP}(\phi)$ for a waveplate. This captures an important notion of the behavior of rotated optical devices: they can be modeled as a sequence consisting of a rotation, the normal un-rotated behavior, and a counter-rotation.

2. The Poincaré Sphere

The Stokes parameters can also be expressed in terms of orientation and ellipticity angles, $\psi$ and $\chi$, of the polarization ellipse. In terms of these angles, the Stokes vector is then found to have the form given in equation (11):

$$S = \begin{pmatrix} S_0 \\ S_1 \\ S_2 \\ S_3 \end{pmatrix} = \begin{pmatrix} 1 \\ \cos2\chi\cos2\psi \\ \cos2\chi\sin2\psi \\ \sin2\chi \end{pmatrix} \quad (11)$$

where: $0 \leq \psi \leq \pi$ and $-\frac{\pi}{4} \leq \chi \leq \frac{\pi}{4}$

A sphere can be constructed in which Cartesian x-, y-, and z-axes are represented in terms of the Stokes parameters $S_1$, $S_2$, and $S_3$, respectively. This spherical representation is known as the Poincaré Sphere and is shown in FIG. 1. Angle $\psi$ is measured as an azimuth from the $S_1$, axis in the $S_1$–$S_2$ plane; elevation angle $\chi$ is measured positively above the equator and negatively below the equator. In particular, degenerate forms (linear and circularly polarized light) are found as follows. For $\chi = \pm\pi/4$, equation (11) becomes equations (12a) and (12b) as follows:

$$S_{RCP} = \begin{pmatrix} S_0 \\ S_1 \\ S_2 \\ S_3 \end{pmatrix} = \begin{pmatrix} 1 \\ \cos\pi/2 \cos2\psi \\ \cos\pi/2 \sin2\psi \\ \sin\pi/2 \end{pmatrix} = \begin{pmatrix} 1 \\ 0 \\ 0 \\ 1 \end{pmatrix} \quad (12a)$$

$$S_{RCP} = \begin{pmatrix} S_0 \\ S_1 \\ S_2 \\ S_3 \end{pmatrix} = \begin{pmatrix} 1 \\ \cos(-\pi/2) \cos2\psi \\ \cos(-\pi/2) \sin2\psi \\ \sin(-\pi/2) \end{pmatrix} = \begin{pmatrix} 1 \\ 0 \\ 0 \\ -1 \end{pmatrix} \quad (12b)$$

These two Stokes vectors represent right- and left-circularly polarized light and correspond to north and south poles of the Poincaré Sphere along the positive and negative $S_3$ axis, respectively. This is emphasized by retaining notation for the Stokes vector preceding each of the specific Stokes vectors in equations (12a) and (12b).

The equator on the Poincaré Sphere corresponds to $\chi=0$. Hence, equation (11) reduces to equation (13) as follows:

$$S_{LP} = \begin{pmatrix} S_0 \\ S_1 \\ S_2 \\ S_3 \end{pmatrix} = \begin{pmatrix} 1 \\ \cos 2\psi \\ \sin 2\psi \\ 0 \end{pmatrix} \quad (13)$$

Equation (13) is the Stokes vector for linearly polarized light. Thus, along the equator, all polarization states are linearly polarized. The degenerate forms for linearly polarized light are then found by setting $\psi=0$, $\pi/4$, $\pi/2$, and $3\pi/4$, respectively. Equation (13) then reduces to the following corresponding forms, as given by equations (14a) and (14b):

$$S_{LHP} = \begin{pmatrix} S_0 \\ S_1 \\ S_2 \\ S_3 \end{pmatrix} = \begin{pmatrix} 1 \\ 1 \\ 0 \\ 0 \end{pmatrix} \quad S_{L+45P} = \begin{pmatrix} S_0 \\ S_1 \\ S_2 \\ S_3 \end{pmatrix} = \begin{pmatrix} 1 \\ 0 \\ 1 \\ 0 \end{pmatrix} \quad (14a)$$

$$S_{LVP} = \begin{pmatrix} S_0 \\ S_1 \\ S_2 \\ S_3 \end{pmatrix} = \begin{pmatrix} 1 \\ -1 \\ 0 \\ 0 \end{pmatrix} \quad S_{L-45P} = \begin{pmatrix} S_0 \\ S_1 \\ S_2 \\ S_3 \end{pmatrix} = \begin{pmatrix} 1 \\ 0 \\ -1 \\ 0 \end{pmatrix} \quad (14b)$$

Equations (14a) and (14b) clearly show that linearly horizontal polarized light and linear vertical polarized light are associated with the positive and negative Stokes parameter $S_1$, and linear +45 polarized light and the linear −45 polarized light are associated with the positive and negative $S_2$ parameter.

Figure 2:
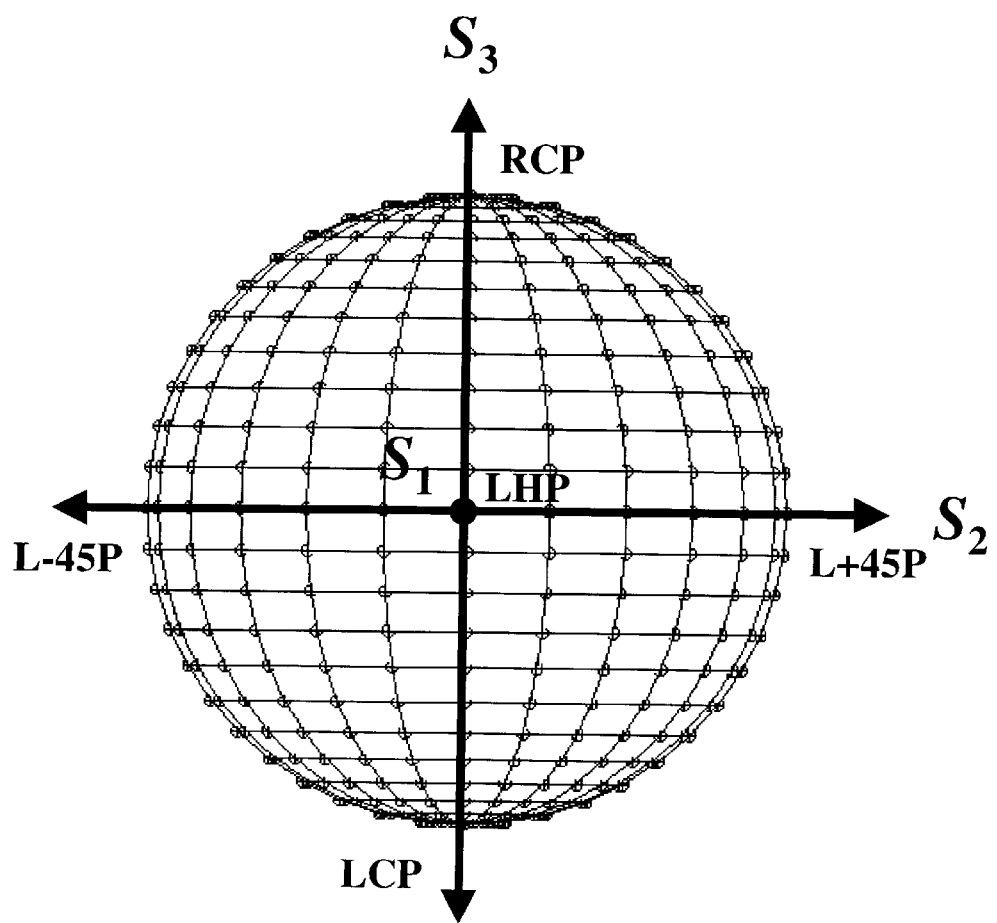
FIG. 2 depicts degenerate polarization states plotted on the Poincaré Sphere.

FIG. 2 shows the degenerate polarization states on the Poincaré Sphere.

We now describe an important property of the Poincaré Sphere, namely, its rotational behavior. In order to understand this behavior we consider that an input beam, represented by equation (11), propagates through a rotator described by equation (8). Then, the Stokes vector of the output beam becomes, as given by equations (15) and (16):

$$S'=M_{ROT}(\theta) \cdot S \quad (15)$$

and $$S' = \begin{pmatrix} S'_0 \\ S'_1 \\ S'_2 \\ S'_3 \end{pmatrix} = \begin{pmatrix} 1 & 0 & 0 & 0 \\ 0 & \cos 2\theta & \sin 2\theta & 0 \\ 0 & -\sin 2\theta & \cos 2\theta & 0 \\ 0 & 0 & 0 & 1 \end{pmatrix} \cdot \begin{pmatrix} 1 \\ \cos 2\chi \cos 2\psi \\ \cos 2\chi \sin 2\psi \\ \sin 2\chi \end{pmatrix}. \quad (16)$$

Carrying out the matrix multiplication in equation (16) and simplifying leads to equation (17):

$$S'_{ROT} = \begin{pmatrix} S'_0 \\ S'_1 \\ S'_2 \\ S'_3 \end{pmatrix} = \begin{pmatrix} 1 \\ \cos 2\chi \cos(2\psi - 2\theta) \\ \cos 2\chi \sin(2\psi - 2\theta) \\ \sin 2\chi \end{pmatrix} \quad (17)$$

Thus, the operation of a rotation on the incident beam leads to the Stokes vector of the output beam in which the initial value of $\psi$ is decreased by the rotation angle $\theta$. This shows the most powerful aspect of the Poincaré sphere, namely, its ability to calculate electric field rotation for any input polarization state whatever, simply by measuring out a known angular displacement along a latitudinal circle (constant $\chi$).

Next, consider that the incident beam propagating through a waveplate represented by equation (7). Using equation (11), the Stokes vector of the output beam becomes, as indicated in equation (18a):

$$S'_{WP} = \begin{pmatrix} S'_0 \\ S'_1 \\ S'_2 \\ S'_3 \end{pmatrix} = \begin{pmatrix} 1 \\ \cos 2\chi \cos 2\psi \\ \cos 2\chi \sin 2\psi \cos\phi - \sin 2\chi \sin\phi \\ \cos 2\chi \sin 2\psi \sin\phi + \sin 2\chi \cos\phi \end{pmatrix} \quad (18a)$$

We see that there is no trigonometric simplification in the matrix elements when the input beam propagates through a waveplate, unlike that of propagation through a rotator. Thus, phase shifting, unlike rotation, does not have a simple geometric interpretation in the Poincaré coordinate system. Although equation (18a) does, in fact, describe a geometric operation of rotation, it is a rotation about an axis orthogonal to Poincaré's.

For completeness, we should note a special case where the Poincaré coordinate system maps phase shift in a natural way, namely along meridians described by $\psi=\pm\pi/2$. Applying these values to equation (18a) and simplifying yields:

$$S'_{WP} = \begin{pmatrix} S'_0 \\ S'_1 \\ S'_2 \\ S'_3 \end{pmatrix} = \begin{pmatrix} 1 \\ 0 \\ \cos 2\chi \cos\phi - \sin 2\chi \sin\phi \\ \cos 2\chi \sin\phi + \sin 2\chi \cos\phi \end{pmatrix} = \begin{pmatrix} 1 \\ 0 \\ \cos(2\chi - \phi) \\ \sin(2\chi - \phi) \end{pmatrix}. \quad (18b)$$

Unfortunately, this result is of limited use because there is no simple optical device that will convert a beam of light to have a SOP along the $\psi=\pm\pi/2$ circle.

Finally, consider propagation of an incident beam, equation (11), through an ideal linear polarizer represented by the Mueller matrix as described by equation (9). We have:

$$S'=M_{POL} \cdot S \quad (19a)$$

so:

$$S'_{POL} = \begin{pmatrix} S'_0 \\ S'_1 \\ S'_2 \\ S'_3 \end{pmatrix} = \frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix} \cdot \begin{pmatrix} 1 \\ \cos 2\chi \cos 2\psi \\ \cos 2\chi \sin 2\psi \\ \sin 2\chi \end{pmatrix} \quad (19b)$$

and:

$$S'_{POL} = \begin{pmatrix} S'_0 \\ S'_1 \\ S'_2 \\ S'_3 \end{pmatrix} = \frac{1}{2}(1 + \cos 2\chi \cos 2\psi)\begin{pmatrix} 1 \\ 1 \\ 0 \\ 0 \end{pmatrix} \quad (19c)$$

Equation (19c) is the Stokes vector of linearly horizontal polarized light (see equation (14a)). Equation (19c) states that regardless of the polarization state of the input beam, when the beam propagates through a linear polarizer, the polarization state of the output beam will always be linearly horizontal polarized.

3. OPS

An alternative representation of the Stokes parameters can be expressed in terms of a different set of angles, namely, auxiliary angle $\alpha$, which is a measure of an intensity ratio of the orthogonal components of the beam, and phase angle $\delta$. The two angles, $\alpha$ and $\delta$, are associated with observables (measurables) of the field vectors of an electromagnetic wave. Angle $\delta$ appeared directly in equation (2), while $\alpha$ is a polar version of the differential intensity of the two principal field components, or their time-averaged Stokes equivalent: $2\alpha = \cos^{-1}(E_{0x}^2 - E_{0y}^2)$.

Analysis shows that the time-averaged Stokes vector then has the following form in terms of $\alpha$ and $\delta$:

$$S = \begin{pmatrix} S_0 \\ S_1 \\ S_2 \\ S_3 \end{pmatrix} = \begin{pmatrix} 1 \\ \cos 2\alpha \\ \sin 2\alpha \cos \delta \\ \sin 2\alpha \sin \delta \end{pmatrix} \quad 0 \leq \alpha \leq \pi/2 \text{ and } 0 \leq \delta < 2\pi \quad (20)$$

Figure 3:
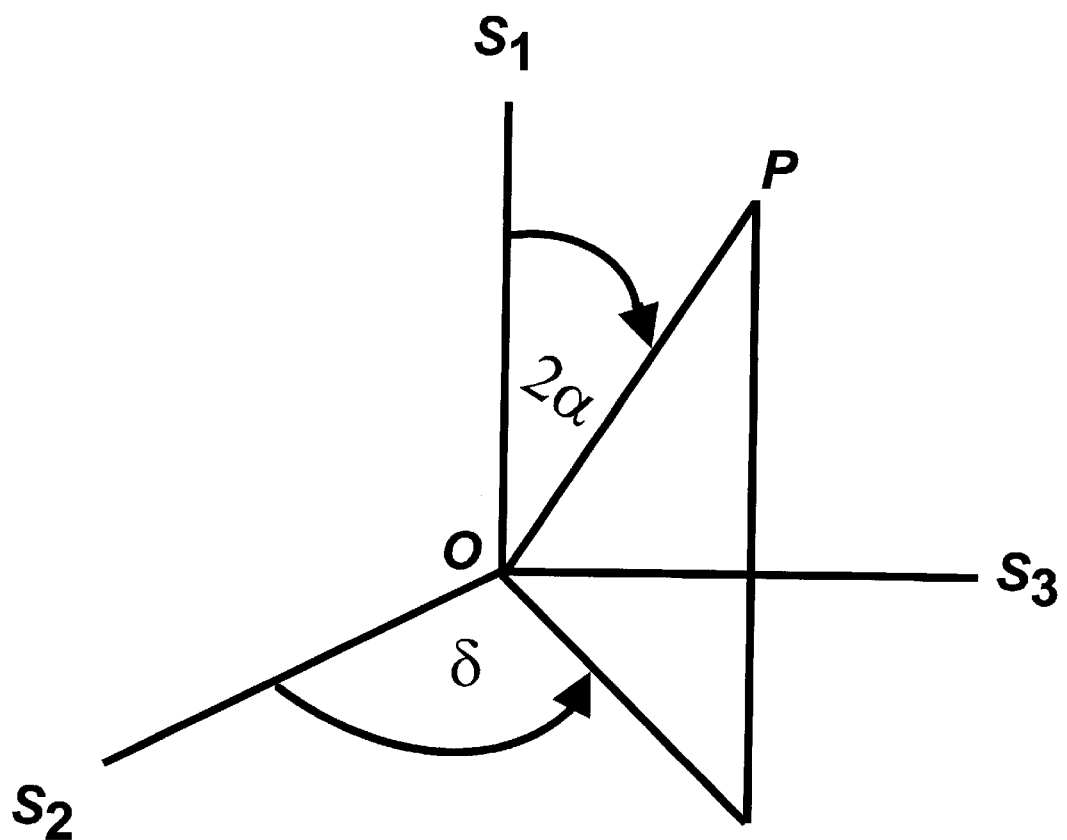
FIG. 3 depicts spherical coordinates of the Observable Polarization Sphere (OPS)

A sphere can be constructed in the Cartesian x-, y-, and z-axes now represented in terms of Stokes parameters $S_2$, $S_3$, and $S_1$, respectively. FIG. 3 shows the spherical angles of the OPS. As shown, elevation angle $\alpha$ is measured from vertical $S_1$ axis; azimuth angle $\delta$ is measured along the equator in the $S_2$–$S_3$ plane. In particular, the degenerate forms (linear and circularly polarized light) are found as follows. For $\alpha = \pi/4$ and $\delta = \pi/2$, and $\alpha = \pi/4$ and $\delta = \pi/2$ equation (20) becomes, as given by equations (21):

$$S_{RCP} = \begin{pmatrix} S_0 \\ S_1 \\ S_2 \\ S_3 \end{pmatrix} = \begin{pmatrix} 1 \\ 0 \\ 0 \\ 1 \end{pmatrix} \quad S_{LCP} = \begin{pmatrix} S_0 \\ S_1 \\ S_2 \\ S_3 \end{pmatrix} = \begin{pmatrix} 1 \\ 0 \\ 0 \\ -1 \end{pmatrix} \quad (21)$$

These two Stokes vectors are located at east and west ends of the equator of the OPS, that is, along the positive and negative $S_3$ axis, respectively. This is emphasized by retaining the notation for the Stokes vector preceding each of the specific Stokes vectors in equations (21).

The prime meridian corresponds to $\delta = 0$ and we see equation (20) reduces to equation (22) as follows:

$$S_{LP} = \begin{pmatrix} S_0 \\ S_1 \\ S_2 \\ S_3 \end{pmatrix} = \begin{pmatrix} 1 \\ \cos 2\alpha \\ \sin 2\alpha \\ 0 \end{pmatrix} \quad (22)$$

Thus, all polarization states on the prime meridian are linearly polarized. The degenerate states (Stokes vectors) are then found by setting $\alpha = 0$, $\pi/4$, $\pi/2$, and in equation (20) $\alpha = \pi/4$, $\delta = \pi$, respectively. Equation (22) then reduces to the following forms, as given by equations (23a) and (23b):

$$S_{LHP} = \begin{pmatrix} S_0 \\ S_1 \\ S_2 \\ S_3 \end{pmatrix} = \begin{pmatrix} 1 \\ 1 \\ 0 \\ 0 \end{pmatrix} \quad S_{L+45P} = \begin{pmatrix} S_0 \\ S_1 \\ S_2 \\ S_3 \end{pmatrix} = \begin{pmatrix} 1 \\ 0 \\ 1 \\ 0 \end{pmatrix} \quad (23a)$$

$$S_{LVP} = \begin{pmatrix} S_0 \\ S_1 \\ S_2 \\ S_3 \end{pmatrix} = \begin{pmatrix} 1 \\ -1 \\ 0 \\ 0 \end{pmatrix} \quad S_{L-45P} = \begin{pmatrix} S_0 \\ S_1 \\ S_2 \\ S_3 \end{pmatrix} = \begin{pmatrix} 1 \\ 0 \\ -1 \\ 0 \end{pmatrix} \quad (23b)$$

Equations (23a) and (23b) show that linearly horizontal polarized light and linearly vertical polarized light are associated with the positive and negative Stokes parameter $S_1$, respectively; and the linearly +45 polarized light and the linearly −45 polarized light are associated with the positive and negative $S_2$ parameter, respectively.

Figure 4:
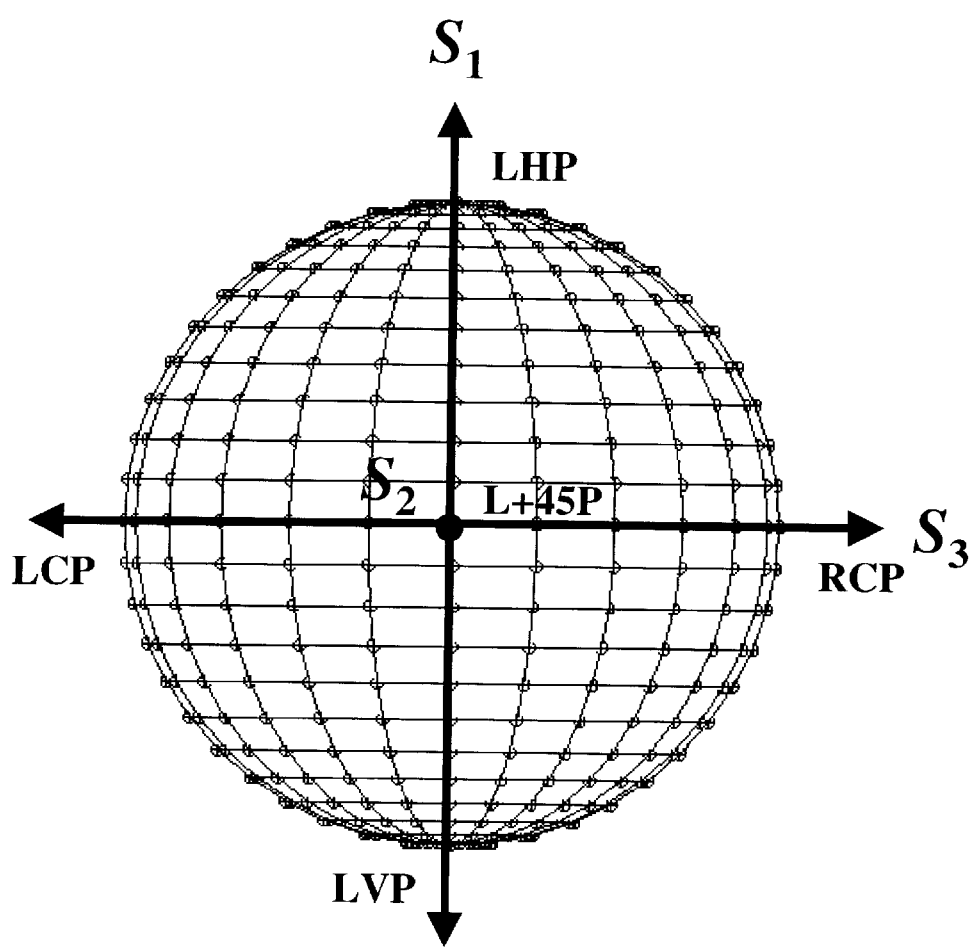
FIG. 4 depicts degenerate polarization states plotted on the OPS.

FIG. 4 shows the degenerate polarization states on the OPS.

We now describe an important property (behavior) of the Stokes vector, equation (20), on the OPS. In order to understand this behavior, consider an input beam represented by equation (20) that propagates through a waveplate (phase shifter), as described by equation (7). Then, the Stokes vector of the output beam is given by equations (25a) and (25b) as follows:

$$S' = M_{WP}(\phi) \cdot S \quad (25a)$$

and $$S' = \begin{pmatrix} S_0' \\ S_1' \\ S_2' \\ S_3' \end{pmatrix} = \begin{pmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{pmatrix} \cdot \begin{pmatrix} 1 \\ \cos 2\alpha \\ \sin 2\alpha \cos \delta \\ \sin 2\alpha \sin \delta \end{pmatrix} \quad (25b)$$

Carrying out the matrix multiplication in equation (25b) and simplifying yields equation (26):

$$S'_{WP} = \begin{pmatrix} S_0' \\ S_1' \\ S_2' \\ S_3' \end{pmatrix} = \begin{pmatrix} 1 \\ \cos 2\alpha \\ \sin 2\alpha \cos(\delta + \phi) \\ \sin 2\alpha \sin(\delta + \phi) \end{pmatrix} \quad (26)$$

The phase of the waveplate is added directly to the phase shift of the incident beam. This means that on the OPS, phase shifts correspond to angular displacements along latitude lines (constant $\alpha$). This is precisely analogous to how the Poincaré Sphere treats rotations.

Consider now that the incident beam, equation (20), propagates through a rotator represented by equation (8). The output beam is then given by:

$$S'_{ROT} = \begin{pmatrix} S_0' \\ S_1' \\ S_2' \\ S_3' \end{pmatrix} = \begin{pmatrix} 1 \\ \cos 2\alpha \cos 2\theta + \sin 2\alpha \sin 2\theta \cos \delta \\ -\cos 2\alpha \sin 2\theta + \sin 2\alpha \cos 2\theta \cos \delta \\ \sin 2\alpha \sin \delta \end{pmatrix} \quad (27a)$$

Equation (27a) shows that there is, in general, no trigonometric simplification in the matrix elements when the input beam propagates through a rotator. Thus, phase shifting is simplified on the OPS but rotation is not. Hence, the Poincaré Sphere and the OPS behave in opposite manners for rotation and for phase shifting.

There is, however, an important special case where the OPS does simplify rotation, namely along the prime meridian and its opposite meridian (i.e. $\delta = 0$ and $\delta = \pi$). Substituting either of these values into equation (27a) and simplifying yields:

$$S'_{ROT} = \begin{pmatrix} S_0' \\ S_1' \\ S_2' \\ S_3' \end{pmatrix} = \begin{pmatrix} 1 \\ \cos 2\alpha \cos 2\theta + \sin 2\alpha \sin 2\theta \\ -\cos 2\alpha \sin 2\theta + \sin 2\alpha \cos 2\theta \\ 0 \end{pmatrix} = \begin{pmatrix} 1 \\ \cos(2\alpha - 2\theta) \\ \sin(2\alpha - 2\theta) \\ 0 \end{pmatrix} \quad (27b)$$

Since the prime meridian of the OPS corresponds to linearly polarized light, this means that the OPS can be used to compute rotation for any linearly polarized SOP. This result is analogous to the ψ=±π/2 meridian on the Poincaré sphere that can model phase shift, but it is much more advantageous. We previously noted that there is no simple optical device that can will convert the SOP of incident light to lie on a ψ=±π/2 meridian of the Poincaré Sphere, but there is such a device for the prime meridian of the OPS: the linear polarizer. This constitutes a significant advantage provided by our inventive OPS technique over prior art.

So, consider the propagation of an incident beam represented by equation (20) through an ideal linear polarizer represented by the Mueller matrix, the latter described by equation (9). We then see that:

$$S' = M_{POL} \cdot S \tag{28a}$$

$$S'_{POL} = \begin{pmatrix} S'_0 \\ S'_1 \\ S'_2 \\ S'_3 \end{pmatrix} = \frac{1}{2}(1 + \cos 2\alpha) \begin{pmatrix} 1 \\ 1 \\ 0 \\ 0 \end{pmatrix} \tag{28b}$$

What results is a Stokes vector that is linearly horizontal polarized. Thus, in both the Poincaré Sphere and OPS formulations, the linear polarizer operation is identical.

Now, consider the case where the ideal linear polarizer is rotated through an angle θ. The Mueller matrix for a rotated ideal linear polarizer is given by equation (29) as follows:

$$M_{POL}(\theta) = M_{ROT}(-\theta) \cdot M_{POL} \cdot M_{ROT}(\theta) \tag{29}$$

where $M_{ROT}(\theta)$ and $M_{POL}$ are given by equations (8) and (9), respectively. Carrying out the matrix multiplication in equation (29) yields equation (30) as follows:

$$M_{POL}(\theta) = \begin{pmatrix} 1 & \cos 2\theta & \sin 2\theta & 0 \\ \cos 2\theta & \cos^2 2\theta & \cos 2\theta \sin 2\theta & 0 \\ \sin 2\theta & \cos 2\theta \sin 2\theta & \sin^2 2\theta & 0 \\ 0 & 0 & 0 & 0 \end{pmatrix} \tag{30}$$

Finally, multiplying the Stokes vector of the input beam, represented by equation (20), with equation (30) yields:

$$S' = \frac{1}{2}(S_0 + S_1 \cos 2\theta + S_2 \sin 2\theta) \begin{pmatrix} 1 \\ \cos 2\theta \\ \sin 2\theta \\ 0 \end{pmatrix} \tag{31}$$

Equation (31) shows that regardless of the state of polarization of the incident beam, the Stokes vector of the output beam will always be on the prime meridian of the OPS, which corresponds to the equator for the Poincaré Sphere.

To summarize: on the OPS, all movements due to phase shifting take place only along latitudinal circles. Movement along the latitudinal circle toward the right of the prime meridian (increasing δ) corresponds to a positive phase shift. Movement from the prime meridian to the left corresponds to a negative phase shift. Rotation of a linear polarizer corresponds to angular displacement along the prime meridian.

For completeness, we mention the effects of rotation on waveplates. In this case, equation (32) is used as follows:

$$M_{WP}(\phi,\theta) = M_{ROT}(-\theta) \cdot M_{WP}(\phi) \cdot M_{ROT}(\theta) \tag{32}$$

where the Mueller matrix $M_{WP}(\phi)$ is given by equation (7) and $M_{ROT}(\theta)$ is given by equation (8). Neither the Poincaré Sphere nor the OPS offers a simple method for computing the effect of a rotated waveplate on an arbitrary input SOP, because both rotations and phase shifts are involved. Nonetheless, a small advantage accrues to the OPS because it provides better support for analyzing certain important combinations where a linear polarizer is used to feed degenerate SOPs into a rotated waveplate.

B. Utilizing the OPS to Compute Optical Device Behavior

With this in mind, we now consider in more detail the steps for computing the behaviors of optical devices using the OPS coordinate system as a representation.

1. Phase Shifting

We begin with an incident beam being represented by a polarization state given by a Stokes vector S, or equivalently by coordinates α and δ. The Mueller matrix for phase shifting is given by equation (7) as follows:

$$M_{WP}(\phi) = \begin{pmatrix} 1 & 0 & 0 & 0 \\ 0 & 1 & 0 & 0 \\ 0 & 0 & \cos\phi & -\sin\phi \\ 0 & 0 & \sin\phi & \cos\phi \end{pmatrix} \tag{7}$$

The input Stokes vector moves along the latitudinal circle in a positive direction according to equation (38):

$$S' = M_{WP}(\phi) \cdot S \tag{38}$$

through an angle φ to S'.

Figure 5A:
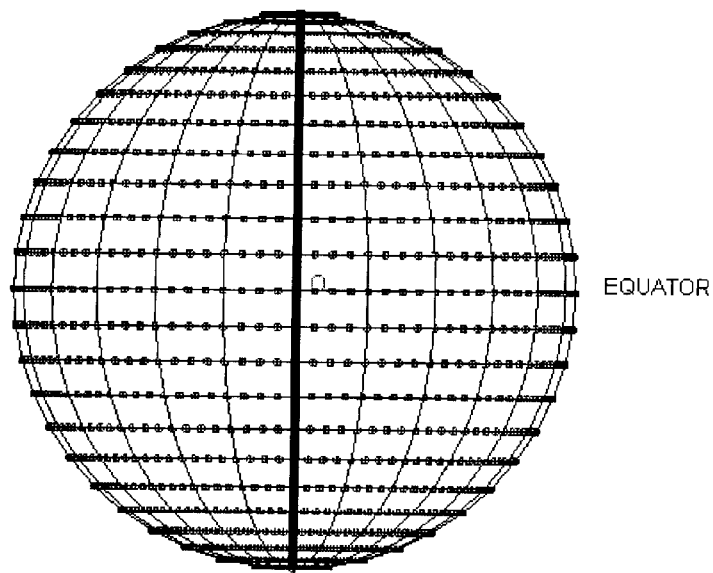
FIGS. 5a and 5b collectively depict latitudinal circles plotted on the OPS, with FIG. 5A showing an equatorial view and FIG. 5b showing a 45°–45° view.
Figure 5B:
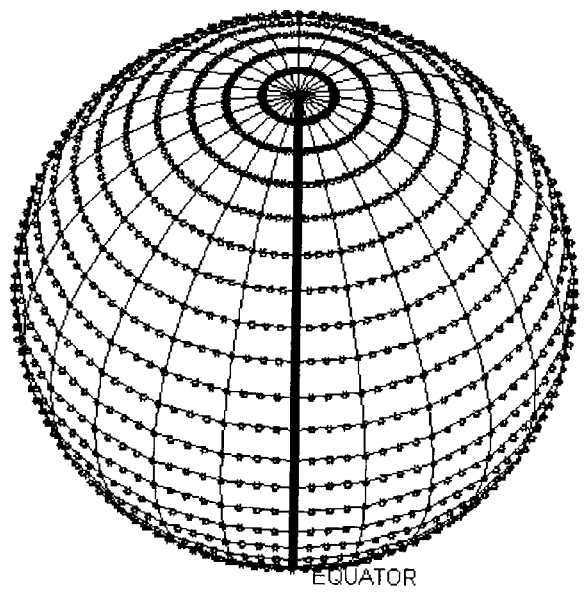

FIG. 5 uses dotted lines to show the latitudinal (horizontally aligned) circles along which phase shifting takes place. Longitudinal (vertically aligned) meridians are solid lines. The heavy vertical line represents the prime meridian (δ=0), relative to which all phase shift is measured. Positive phase-shift corresponds to traversing a latitudinal circle in a counter-clockwise direction, as viewed from the north pole.

Figure 6:
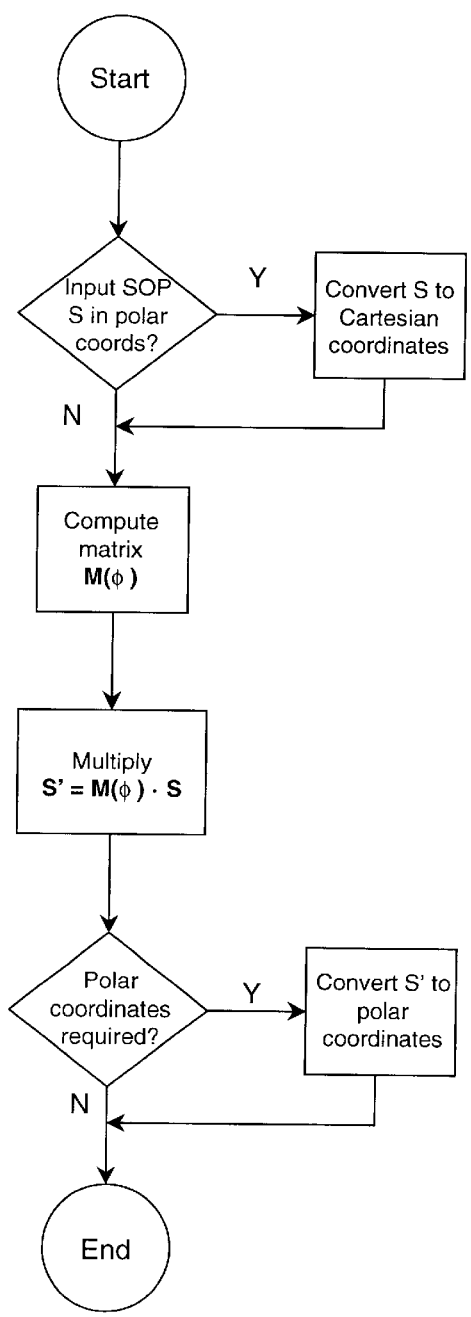
FIG. 6 depicts a flow chart for modeling state of polarization (SOP) phase shift on the OPS (φ) through prior art calculations and on the OPS.
Figure 6:
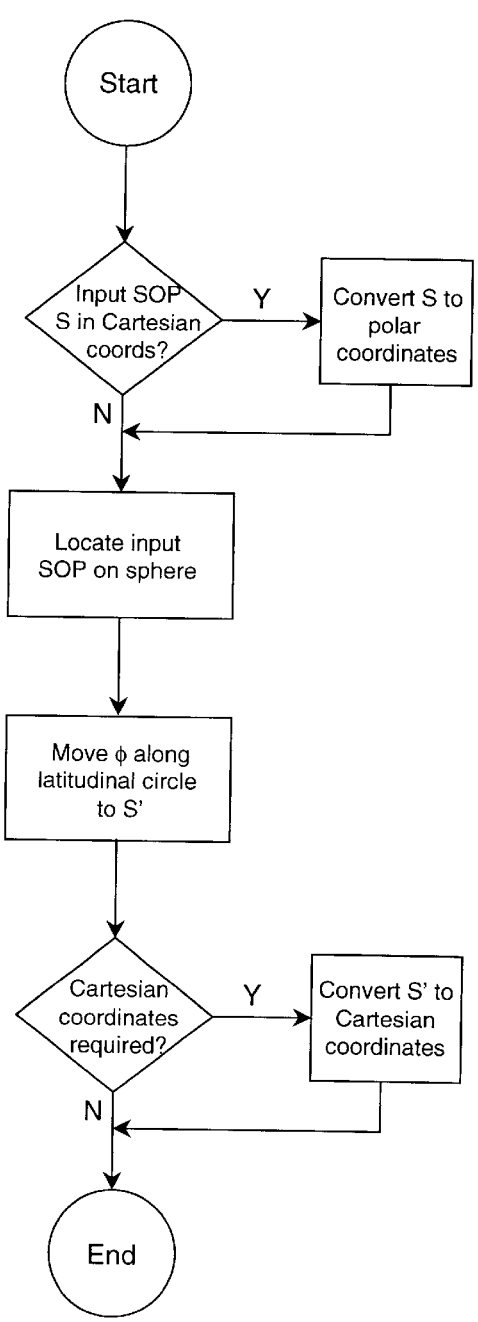

In FIG. 6, two flow charts are presented side-by-side. The left flowchart is a step-by-step description of the prior art methodology for computing a phase shift for a given state of polarization using only the trigonometric and matrix representations of the Mueller/Stokes calculus. The right flowchart demonstrates corresponding steps of our invention, replacing complex calculations by simply measuring out angular displacements on the OPS. All subsequent flowcharts follow a similar format. Note that Mueller/Stokes is based on a Cartesian coordinate space, while the OPS (like the Poincaré Sphere) requires all polarization states to be in spherical polar coordinates.

2. The Rotated Linear Horizontal Polarizer

We now consider the behavior of a rotated ideal linear polarizer on the polarization state of an incident beam. From equation 10, we recall that the operation of a rotated linear polarizer can be decomposed into three simpler operations: a rotation, a linear polarization, and a counter-rotation. In Stokes/Mueller terms:

$$M_{POL}(\theta) = M_{ROT}(-\theta) \cdot M_{POL} \cdot M_{ROT}(\theta) \tag{33}$$

We consider each of these operations in turn. An incident beam is again represented by a Stokes vector S. According to equation (33), this Stokes vector is first rotated 2θ in a positive direction according to equation (39) as follows:

$$S^1 = M_{ROT}(\theta) \cdot S \tag{39}$$

where the superscript "1" indicates that this is the SOP of the beam emerging from the first operation of rotation. Next, the beam $S^1$ propagates through the linear horizontal polarizer.

The Stokes vector of the beam that emerges from the linear polarizer is then given by equation (40) as:

$$S^2 = M_{POL} \cdot S^1 \qquad (40)$$

Regardless of the polarization state of the incident beam, the beam that emerges from the linear polarizer is always linearly polarized. Thus, on the OPS, the point $S^1$ moves directly to a point on the sphere that represents linearly horizontal polarized light, which is the north pole of the OPS. In fact, the first rotation described by equation (36) has no effect on the polarization state of the incident beam $S^2$, whatsoever, so $S^2$ is always located at the north pole on the OPS. Finally, $S^2$ undergoes a negative rotation through an angle $\theta$ along the prime meridian. The Stokes vector of the beam becomes, as given by equation (41):

$$S^3 = M_{ROT}(-\theta) \cdot S^2 \qquad (41)$$

This final rotation operation is accomplished by moving downward on the prime meridian line on the OPS through an angle $2\theta$.

Figure 7:
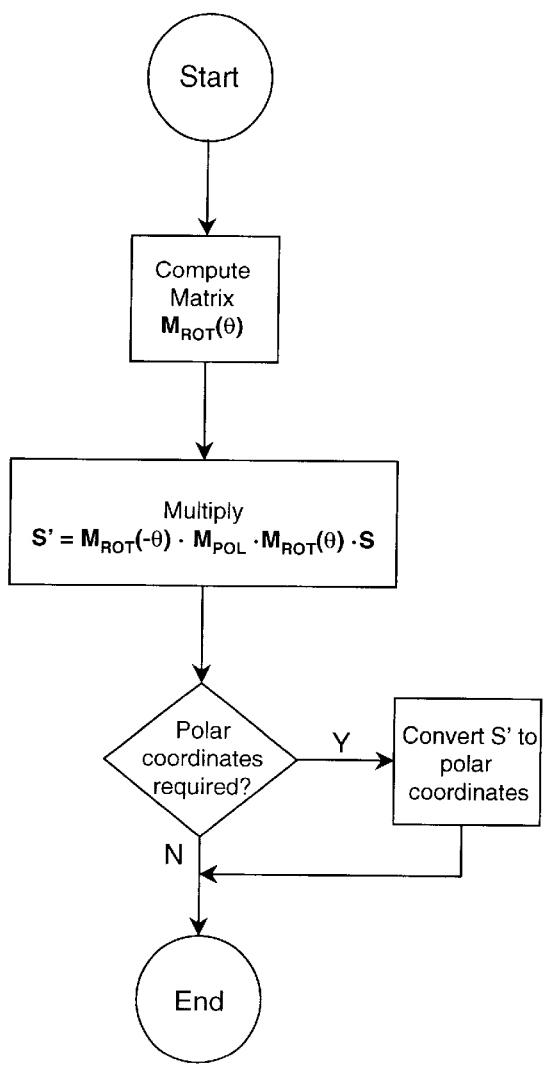
FIG. 7 depicts a flow chart for modeling rotation (θ) of a linear horizontal polarizer through prior art calculations and on the OPS.
Figure 7:
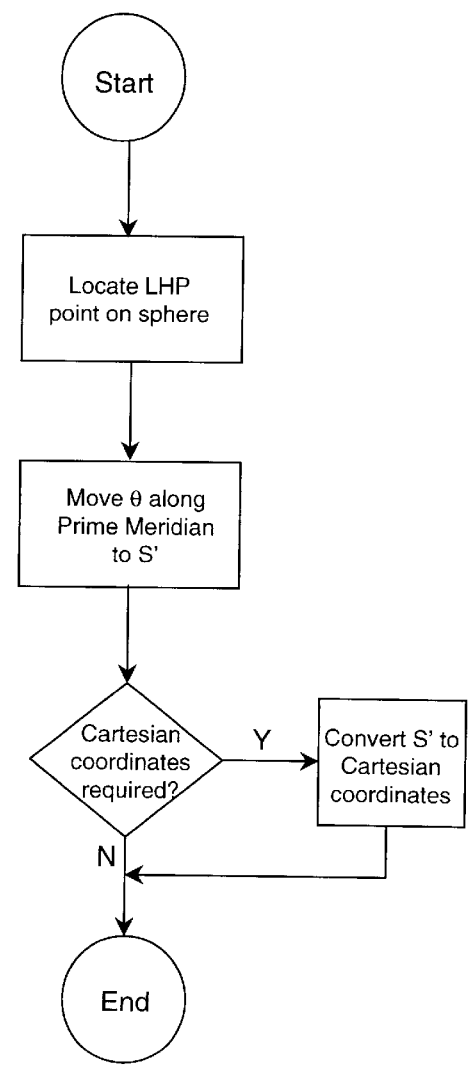

The flowcharts in FIG. 7 compare the Mueller/Stokes calculus and the OPS as methods for computing the polarization transformation of a rotated linear polarizer. The format and interpretation of the flowcharts is identical to FIG. 6.

3. Cascade of Polarizing Elements

Figure 8:
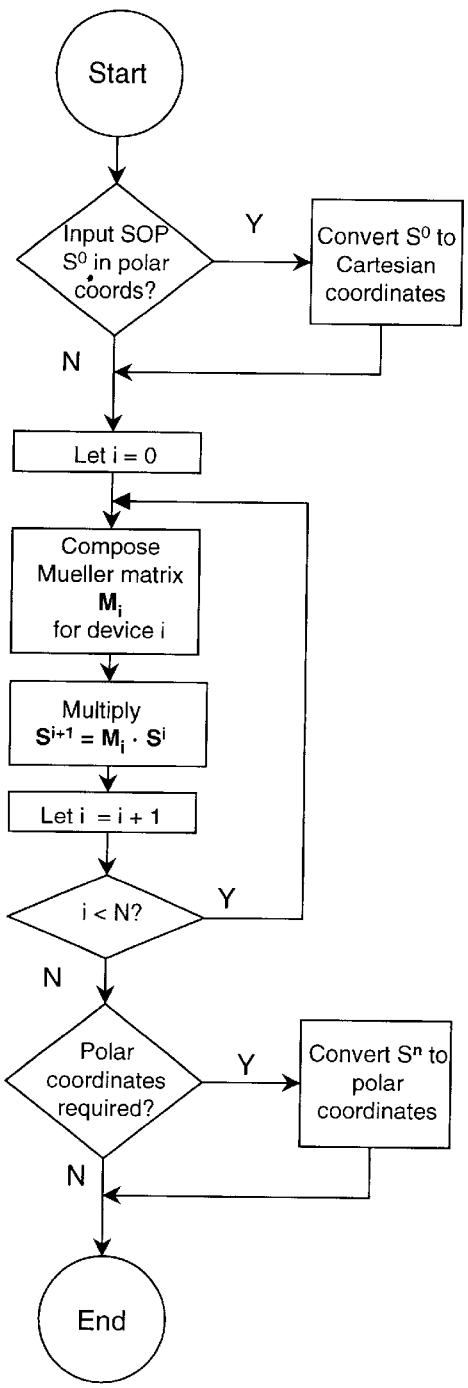
FIG. 8 depicts SOP transformation through a sequence of N optical devices through prior art calculations and on the OPS.
Figure 8:
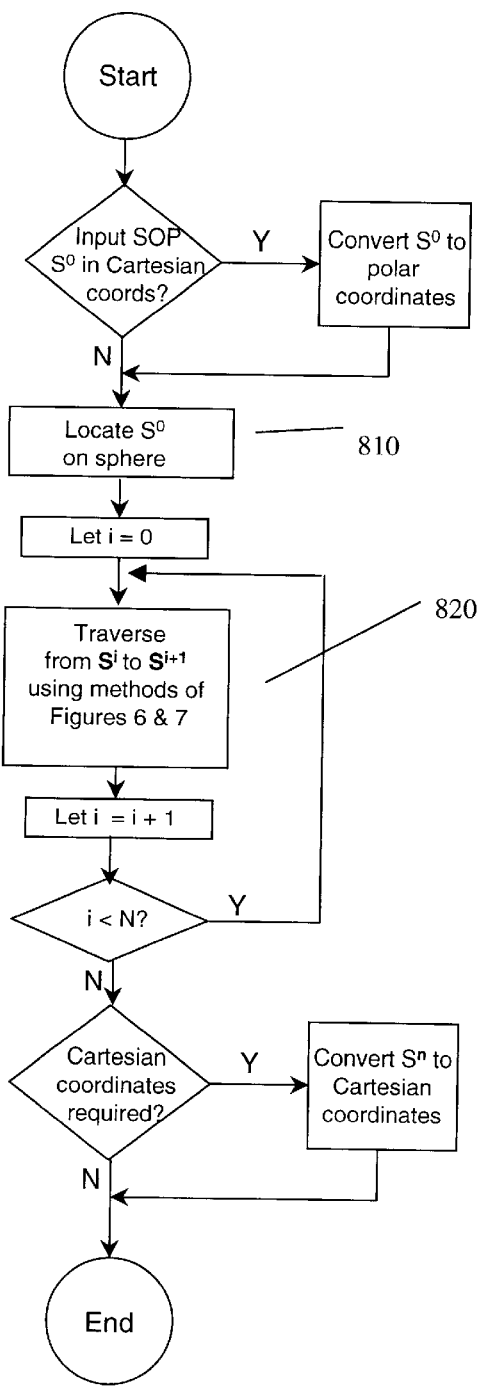

Finally, a cascade of polarizing elements can easily be treated on the OPS. FIG. 8 shows a flow chart of our inventive technique for doing so, comparing the Mueller/Stokes prior art with the corresponding geometric interpolation provided through use of our inventive technique. As can be seen from FIG. 8, our technique relies on locating and plotting a point on the OPS corresponding to the SOP ($S^0$) for the incident beam of a cascade circuit, calculating the output SOP for the first element in succession, and then using that SOP as effectively an origin (starting point) for calculating the output SOP ($S^i$) for the next element; and so on until, for the last cascaded element, the last point is calculated. Initially, steps 810 handle the incident beam, and locate and plot the state of polarization ($S^0$) therefor upon the OPS. Thereafter, loop 820 is entered, which, for each successive optical element in the circuit, calculates its output SOP ($S^i$) and, using the immediately prior plotted point as a new origin, plots a corresponding point on the OPS.

Additionally, when using the OPS to display such calculations, an arc segment is plotted connecting each pair of adjacent SOP points (e.g., $S^i$ and $S^{i+1}$). Each such arc segment traverses either a latitudinal or prime meridian circles from $S^i$ to $S^{i+1}$, depending on the type of the corresponding polarizing element. The entire path drawn on the OPS depicts the changes in polarization provided by each and every element in succession. The final point represents the state of polarization of the beam as it exits the last element in the circuit. As one can appreciate, the OPS, with its overlaid segmented display, provides a powerful technique for visually interpolating and readily depicting changes in optical polarization. This assists its users in verifying, analyzing, and optimizing solutions to optical polarization problems, far more readily than using the Mueller/Stokes calculus in isolation.

Figure 9:
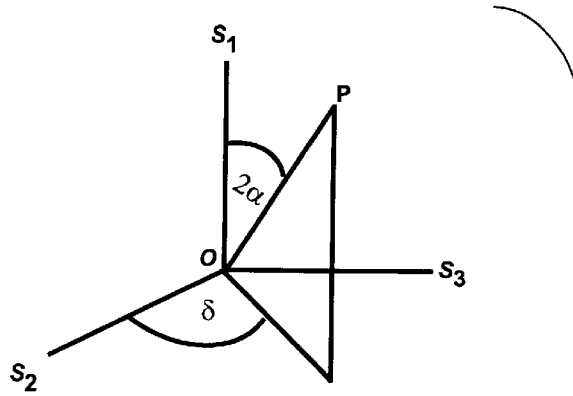
FIG. 9 depicts conversion equations between the Stokes polarization parameters and the spherical coordinates on the OPS.

C. Examples of Propagation of an Input Beam Through a Waveplate and a Rotated Linear Polarizer on the OPS In order to make the preceding analysis concrete, we now consider specific examples of the propagation of a polarized beam through: 1) a waveplate of arbitrary phase and 2) a rotated linear horizontal polarizer. FIG. 9 shows transformation equations that should be used to transform a SOP between the $\alpha$, $\delta$ form and the Stokes Cartesian form.

1. Optical Propagation Through a Waveplate on the OPS

We now consider the behavior of an input beam that propagates through a phase shifter (waveplate) as represented on the OPS. We begin with an input beam characterized by $2\alpha = \pi/3$ and $\delta = 11\pi/6$. Assume we have a waveplate with a phase shift of, e.g., 75° ($= 5\pi/12$). We therefore estimate, using the OPS coordinates directly, that the output SOP will be located at $2\alpha = \pi/3$ and $\delta = 11\pi/6 + 5\pi/12$, or $\delta = \pi/4$ (modulo $2\pi$).

Verifying with Mueller/Stokes, the input Stokes vector, generally represented by equation (20) here becomes as given by equation (42) below:

$$S = \begin{pmatrix} 1 \\ \frac{1}{2} \\ \frac{3}{4} \\ -\frac{\sqrt{3}}{4} \end{pmatrix} \qquad (42)$$

The Mueller matrix for the rotated waveplate, represented by equation (34), is then given here by equation (43):

$$M_{WP}(\phi = 75°) = \begin{pmatrix} 1 & 0 & 0 & 0 \\ 0 & 0 & 0 & 0 \\ 0 & 0 & \cos\left(\frac{5\pi}{12}\right) & -\sin\left(\frac{5\pi}{12}\right) \\ 0 & 0 & \sin\left(\frac{5\pi}{12}\right) & \cos\left(\frac{5\pi}{12}\right) \end{pmatrix} \qquad (43)$$

Multiplying equation (43) by the Stokes vector of the input beam, i.e., equation (42), results in the Stokes vector of the output beam being given by equation (44):

$$S' = \begin{pmatrix} 1 \\ \frac{1}{2} \\ \frac{3}{4}\cos\left(\frac{5\pi}{12}\right) - \frac{\sqrt{3}}{4}\sin\left(\frac{5\pi}{12}\right) \\ \frac{3}{4}\sin\left(\frac{5\pi}{12}\right) + \frac{\sqrt{3}}{4}\cos\left(\frac{5\pi}{12}\right) \end{pmatrix} = \begin{pmatrix} 1 \\ \frac{1}{2} \\ \frac{\sqrt{6}}{4} \\ \frac{\sqrt{6}}{4} \end{pmatrix} \qquad (44)$$

The angles $2\alpha'$ and $\delta'$ are then found to be, using the formulas from FIG. 9:

$$2\alpha' = \arccos\left(\frac{1}{2}\right) = \frac{\pi}{3} = 60° \qquad (45a)$$

$$\delta' = \arctan\left(\frac{\frac{3}{4}\sin\left(\frac{5\pi}{12}\right) + \frac{\sqrt{3}}{4}\cos\left(\frac{5\pi}{12}\right)}{\frac{3}{4}\cos\left(\frac{5\pi}{12}\right) - \frac{\sqrt{3}}{4}\sin\left(\frac{5\pi}{12}\right)}\right) = \arctan(1) = \frac{\pi}{4} = 45° \qquad (45b)$$

Figure 10:
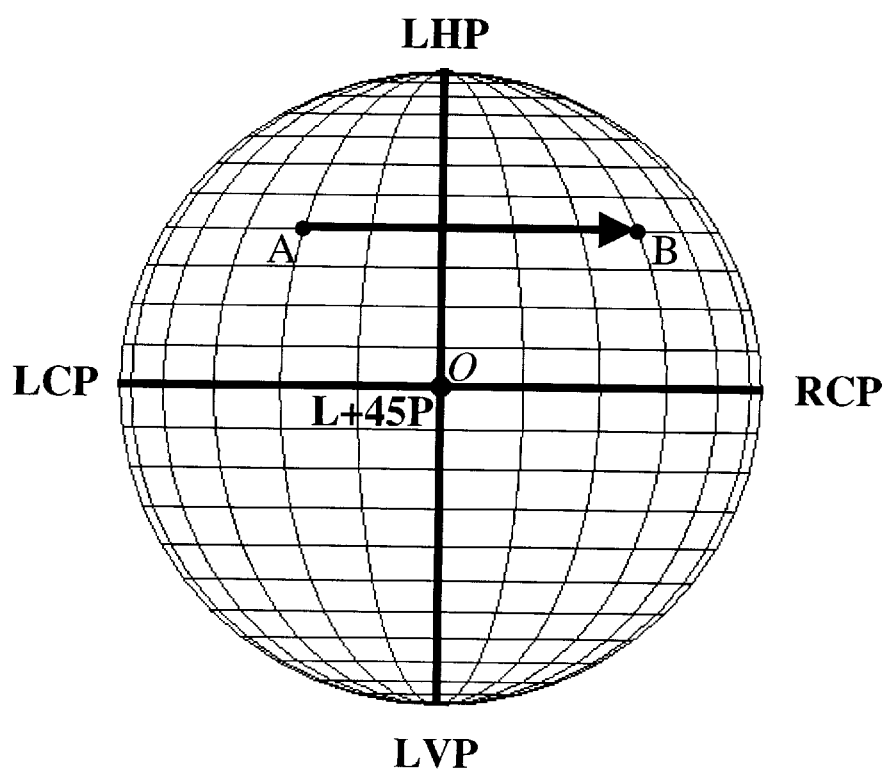
FIG. 10 depicts an illustrative example of phase shifting behavior of a waveplate as represented on the OPS.

The resulting Stokes vector, i.e., equation (44), is seen to agree with the value obtained by moving through 75° on the OPS. In FIG. 10, points A and B represent equations (42) and (44), respectively.

2. Optical Propagation Through a Rotated Linear Horizontal Polarizer on the OPS

The SOP emerging from a rotated linear polarizer always lies on the OPS prime meridian. Its angular displacement down the meridian is always twice the polarizer's rotation.

Suppose we have an incident beam with its SOP on the equator of the OPS with the coordinates $\alpha=\pi/4$ and $\delta=11p/6$. Further, suppose we have a polarizer rotated, e.g., $\theta=15°$, with respect to horizontal. Thus, we interpolate the expected output SOP at $\alpha=2\theta=\pi/6=30°$ and $\delta=0$.

We verify this expectation using Stokes/Mueller. The Stokes vector of a beam that emerges from an ideal linear polarizer rotated through an angle $\theta$ is immediately determined from equation (35) to be, as given by equation (47) below:

$$S' = \frac{1}{2}(S_0 + S_1\cos2\theta + S_2\sin2\theta)\begin{pmatrix} 1 \\ \cos2\theta \\ \sin2\theta \\ 0 \end{pmatrix} \quad (47)$$

The Stokes vector of the incident beam seen from equation (20) to be, as represented by equation (48):

$$S = \begin{pmatrix} 1 \\ \cos2\alpha \\ \sin2\alpha\cos\delta \\ \sin2\alpha\sin\delta \end{pmatrix} = \begin{pmatrix} 1 \\ 0 \\ \frac{\sqrt{3}}{2} \\ -\frac{1}{2} \end{pmatrix} \quad (48)$$

In equation (47), the Stokes parameters of the incident beam appear in a factor outside of the Stokes vector. As such, the polarization state of the input beam does not affect the polarization state of the output beam, merely its overall intensity. The output beam is always linearly polarized and appears on the OPS prime meridian. For a rotation of, e.g., $\theta=15°$, equation (47) shows that the beam is rotated through twice this angle, hence $2\theta=30°$. The Stokes vector of the output beam according to equation (47), ignoring its intensity coefficient, is then given by equation (49):

$$S' = \begin{pmatrix} 1 \\ \cos(\frac{\pi}{3}) \\ \sin(\frac{\pi}{3}) \\ 0 \end{pmatrix} = \begin{pmatrix} 1 \\ \frac{1}{2} \\ \frac{\sqrt{3}}{2} \\ 0 \end{pmatrix} \quad (49)$$

Figure 11:
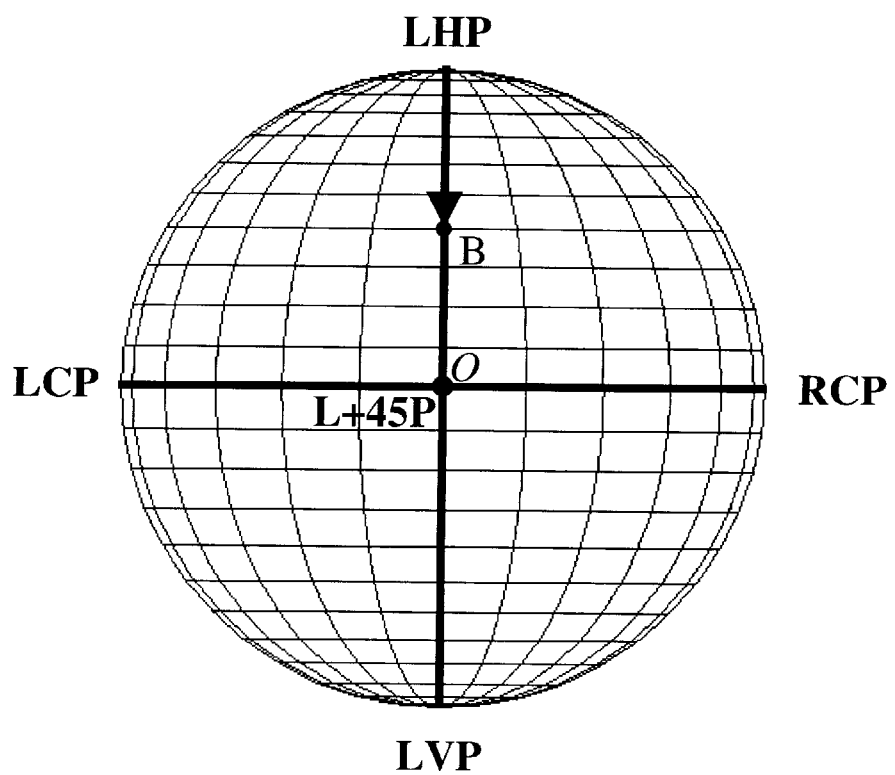
FIG. 11 depicts an illustrative example of the effect of rotation of a linear horizontal polarizer as represented on the OPS.

Accordingly, as given by equation (50):

$$\alpha' = \frac{1}{2}\cos^{-1}\left(\frac{1}{2}\right) = 30° \quad (50)$$

and $2\alpha'=60°$. On the OPS, a physical rotation of $30°$ corresponds to $2\alpha'=60°$ and so one can count down from the north pole along the prime meridian by this amount. FIG. 11 depicts this movement to point B. Alternatively, it may be easier to count (up) from the equator using a complementary angle of $30°$ along the prime meridian.

C. Embodiments

One simple embodiment of this invention is a sphere or globe constructed of plastic or other rigid material. Onto this sphere, latitudes and longitudes in terms of $2\alpha$ and $\delta$ for the OPS are imprinted in the previously described orientation. Using so simple a device, the polarization transformation effected by any sequence of polarizing media (i.e., waveplates or linear polarizers) may be estimated by visual interpolation, without requiring solution of trigonometric equations or the use of any other external calculation aid (e.g., calculator, computer, or slide rule). For simplicity, we collectively define the term polarizing "media" to be any structure, be it bulk, fiber-based, or other dedicated optical device, that transforms or modifies the state of polarization of an optical beam propagating therethrough.

A preferred, and increasingly sophisticated, embodiment of the invention, however, is as a display for polarization information, controlled by a computer or other electronic device. When used as a display, the OPS is not being used directly as a calculating device, but as a method of providing graphical explanations (visualizations) for calculations, using a familiar geometric frame of reference. Used in this way, the OPS can plot polarization transformations for a wider class of devices than it could calculate directly, including rotators and rotated waveplates. The underlying calculations for such devices could be performed by a computer using, e.g., the Mueller/Stokes calculus. All plotted phase shifts, however calculated, would still follow latitudinal circles on the OPS, but rotations (except for those along the prime meridian) would not parallel any OPS latitude or longitude lines.

Figure 12:
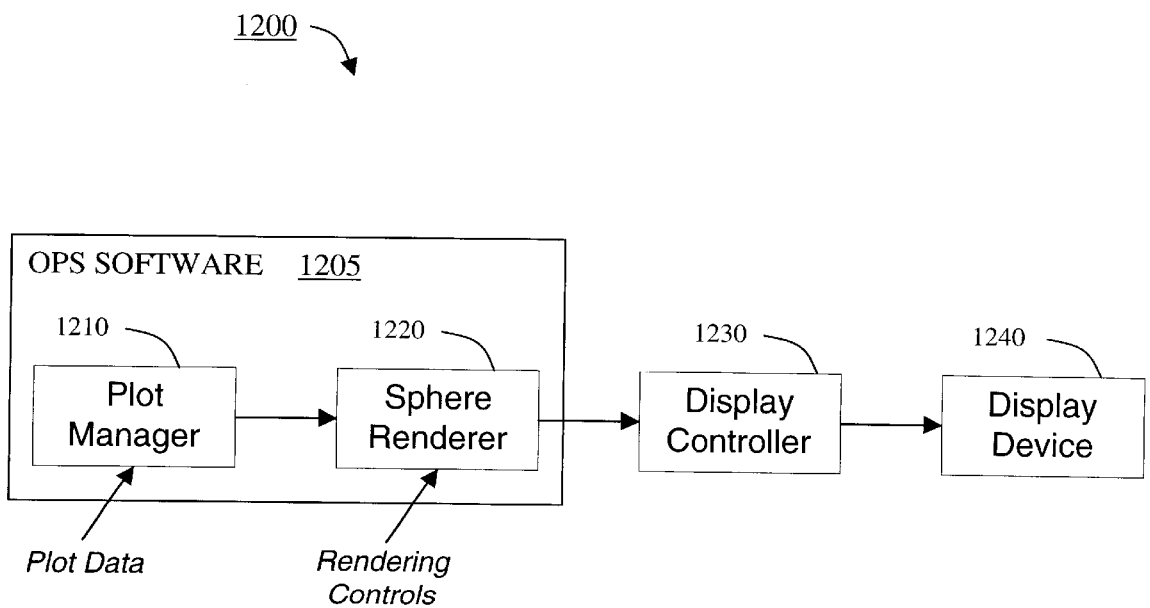
FIG. 12 depicts a very high-level functional block diagram of a preferred embodiment 1200 of the present invention.

FIG. 12 shows a very high-level block diagram of this preferred embodiment (1200) having four interconnected functions.

In particular, block 1210 labeled "Plot Manager", which is implemented as a software program, manages both static and dynamic data plots, provided as input data, upon the OPS. In general, two different kinds of graphic elements are plotted: (a) directed arc segments which represent angular displacements between two successive polarization states; and (b) loci of points, where each point represents a polarization state (SOP) of light.

Directed arc segments display and animate the visual interpolations that humans would perform using a physical globe realization of the OPS. Each phase shift, or polarizer operation in an optical system corresponds to a directed arc segment (e.g., an arrow figure) upon the sphere surface, connecting a "before" polarization state to an "after" polarization state. Furthermore, by dynamically altering the operating parameters of the optical system, corresponding changes in the polarization transformation are animated in real-time upon the sphere. Growth and shrinking of the directed arc segments during the animation show changing contributions of various optical media (e.g., devices) to an aggregate polarization transformation.

Loci of SOP points comprise almost any other kind of graph one could make in elliptical polarization space. These may be discrete points, continuous curves, families of curves, or regions of the sphere, as long as each plotted point represents a polarization state to be included in some set of polarization states. An example is a circle describing possible output polarization states when linearly polarized light is passed through a variable waveplate.

One of the most powerful uses combines the two kinds of plots: a locus of points which describes a set of polarization states achievable from an optical system, and a path of directed line segments animates the correspondence between these points and the device control parameters. An example of such would be a history graph for an optical system whose input SOP, output SOP and control parameters are varying dynamically. The loci of recent input and output SOP would be displayed as curves, while the current control settings would be displayed in terms of directed arc segments depicting rotations and phase shifts. In the event of a system anomaly, the recent history could be replayed to analyze the behavior of each system element in the anomalous time frame.

Block 1220 labeled "Sphere Renderer", which receives plot data from plot manager 1210, depicts the OPS upon the display device. Block 1220 renders three graphical functions: (a) the outline and form of the sphere; (b) latitude and longitude lines for the OPS coordinate system; and (c) data points and figures plotted upon the sphere's surface, as provided by the Plot Manager. Block 1220 may be implemented as a computer program using, e.g., the OpenGL graphics libraries.

Sphere renderer 1220 provides various conventional capabilities, which are common in computerized displays of geometric forms and in the context of the OPS: (a) positions the displayed OPS in any orientation under interactive or program control; (b) scales the size of the OPS under interactive or program control ("zoom"); (c) selects, under user control, any specific point or feature on the sphere's surface and identifies its polar coordinates in the OPS coordinate system; and (d) changes number and resolution of the latitude and longitude lines displayed upon the sphere, either independently or in combination with scaling.

Block 1240 labeled "Display Device" represents a physical device for visually displaying graphical information, such as a monitor, either in perspective on a two-dimensional plane, or stereographically in three dimensions. Display controller 1230, which drives display device 1240 and receives display data from sphere renderer 1220, stores an electronic representation of an image to be displayed on device 1240 and provides electrical signals required to operate and to refresh the display device. This controller, which is conventional, provides a set of well-defined interfaces so that rendering engines may update the image being displayed in real time, and thus achieve animation capabilities. Plot manager 1210 and sphere renderer 1220 are generally software programs, collectively shown as OPS software 1205, implemented on a computer, such as a personal computer (PC). In this case, the display controller would be the video card used within the PC and display device being a CRT or LCD based PC display connected to the display card.

Figure 13:
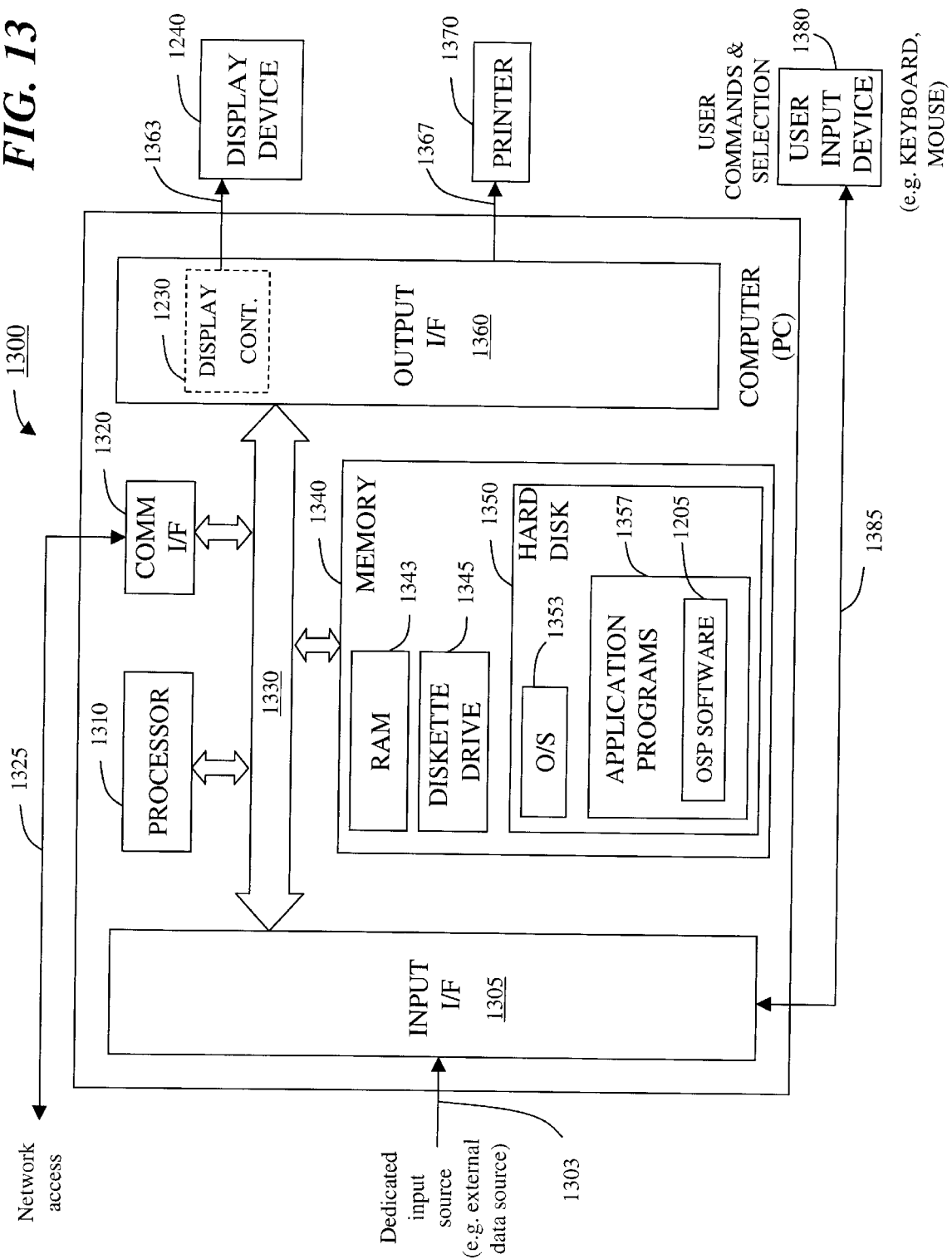
FIG. 13 depicts a high-level block diagram of computer-based, e.g., PC, implementation 1300 of the invention that implement the functionality shown in FIG. 12.

FIG. 13 depicts a block diagram of PC 1300 on which our present invention can be implemented.

As shown in FIG. 13, PC 1300 comprises input interfaces (I/F) 1305, processor 1310, communications interface 1320, memory 1340 and output interfaces 1360, all conventionally interconnected by bus 1330. Memory 1340, which generally includes different conventional modalities; namely, illustratively random access memory (RAM) 1343 for temporary data and instruction store, diskette drive(s) 1343 for exchanging information, as per user command, with floppy diskettes, and non-volatile mass store 1350 that is typically implemented, as shown, through a hard disk, usually magnetic in nature. Mass store 1350 may also contain a CD-ROM or other optical media reader (not specifically shown) (or writer) to read information from (and write information onto) suitable optical storage media. The mass store stores operating system (O/S) 1353 and application programs 1357; the latter illustratively containing OPS software 1205, shown in FIG. 12 and discussed in conjunction therewith above, which incorporate our inventive technique. O/S 1353, shown in FIG. 13, may be implemented by any conventional operating system, such as the WINDOWS 2000 or XP operating system ("WINDOWS 2000" and "WINDOWS XP" are trademarks of Microsoft Corporation of Redmond, Wash.). Given that, we will not discuss any components of O/S 1353 as they are all irrelevant. Suffice it to say, that application programs 1357 execute under control of the O/S. Output interfaces 1360 is shown as collectively including display controller 1230.

Incoming information, such as plot data, can arise from two illustrative external sources: network supplied information through network connection 1325 to communications interface 1320, or from a dedicated input source via path(es) 1303, to input interfaces 1305. Dedicated input can originate from a wide variety of sources such as, e.g., via a dedicated link to some type of dedicated downstream optical measurement and/or control circuitry. In addition, input information can also be provided by inserting a diskette containing plot data and/or other input data store in an electronic file into diskette drive 1345 from which computer 1300, under user instruction, will access and read that file(s) from the diskette. Input interfaces 1305 contain appropriate circuitry to provide necessary and corresponding electrical connections required to physically connect and interface each differing dedicated source of input information to computer system 1300. Under control of the operating system, application programs 1357 exchange commands and data with the external sources, via network connection 1325 or path(es) 1303, to transmit and receive information typically requested by a user during program execution.

Input interfaces 1305 also electrically connect and interface user input device 1380, such as a keyboard and mouse, to computer system 1300. Display device 1240, such as a conventional CRT or LCD color monitor, and printer 1370, such as a conventional laser printer, are connected, via leads 1363 and 1367, respectively, to output interfaces 1360. The display device is connected to display controller 1230 situated within output interfaces 1360 and receives an output video signal therefrom for display. The output interfaces provide requisite circuitry to electrically connect and interface the display and printer to the computer system.

The specific hardware components of PC 1300 are conventional and well-known. Since the specific aspects and characteristics of OPS software 1205 that are necessary to implement the present invention have already been described above, the hardware and software that forms PC 1300 will not be discussed in any further detail.

Though we have described a preferred embodiment as being PC-based, those skilled in the art readily appreciate that an electronic implementation is not so limited. In that regard, the creation and manipulation of the graphical sphere along with the plotting of simulation-generated and/or experimentally obtained data can be accomplished by many techniques including, but not limited to, computer-based systems, embedded microprocessor based designs, logic controlled designs (e.g., field programmable gate arrays—FPGA, or similar), analog operational amplifier based systems (e.g., comprised of elements such as integrators and/or differentiators), or other electronics-based and/or optically-based (e.g., holographic) design/control devices.

We claim:

1. Apparatus (1300) for a computer-based tool for visually representing states of polarization of an optical beam as it propagates through an optical circuit comprising one optical polarizing media or more than one (N) such optical polarizing media connected in a cascade arrangement, the apparatus comprising:

a processor (1310);

a memory (1340), connected to the processor, for storing computer executable instructions therein; and a display device (1240) responsive to the processor;

wherein the processor, in response to execution of the instructions:

accepts data representing a state of polarization in terms of phase shift and attenuation imparted by each of said media to said beam;

converts said data, for each of said media, into Stokes parameters (S);

depicts a spherical representation on the display device, wherein the spherical representation is rendered with latitude and longitude lines;

locates an initial point ($S_0$) on said latitude and longitude lines for the Stokes parameters associated with a first one of the media;

traverses along latitudinal small circles or the prime meridian using said initial point, as a starting point, to the polarization state ($S_i$) for a next successive one of the media so as to define a next starting point for said next successive one media and a path from said initial point to the next starting point; and separately repeats the transversing operations with each successive one of the media in the circuit, as said first one of the media, until a final point is reached, wherein the final point defines a state of optical polarization of the beam as it exits a final one of the media, said next starting point defines a state of optical polarization for the beam as it exits from an associated one of the media, and the path connecting each of said points in succession defines changes in the polarization of the beam as it enters and exits each successive media in the optical circuit.

* * * * *